C. GEISSE.
Boiler for Gas Heaters.
No. 58,807.
Patented Oct. 16, 1866.
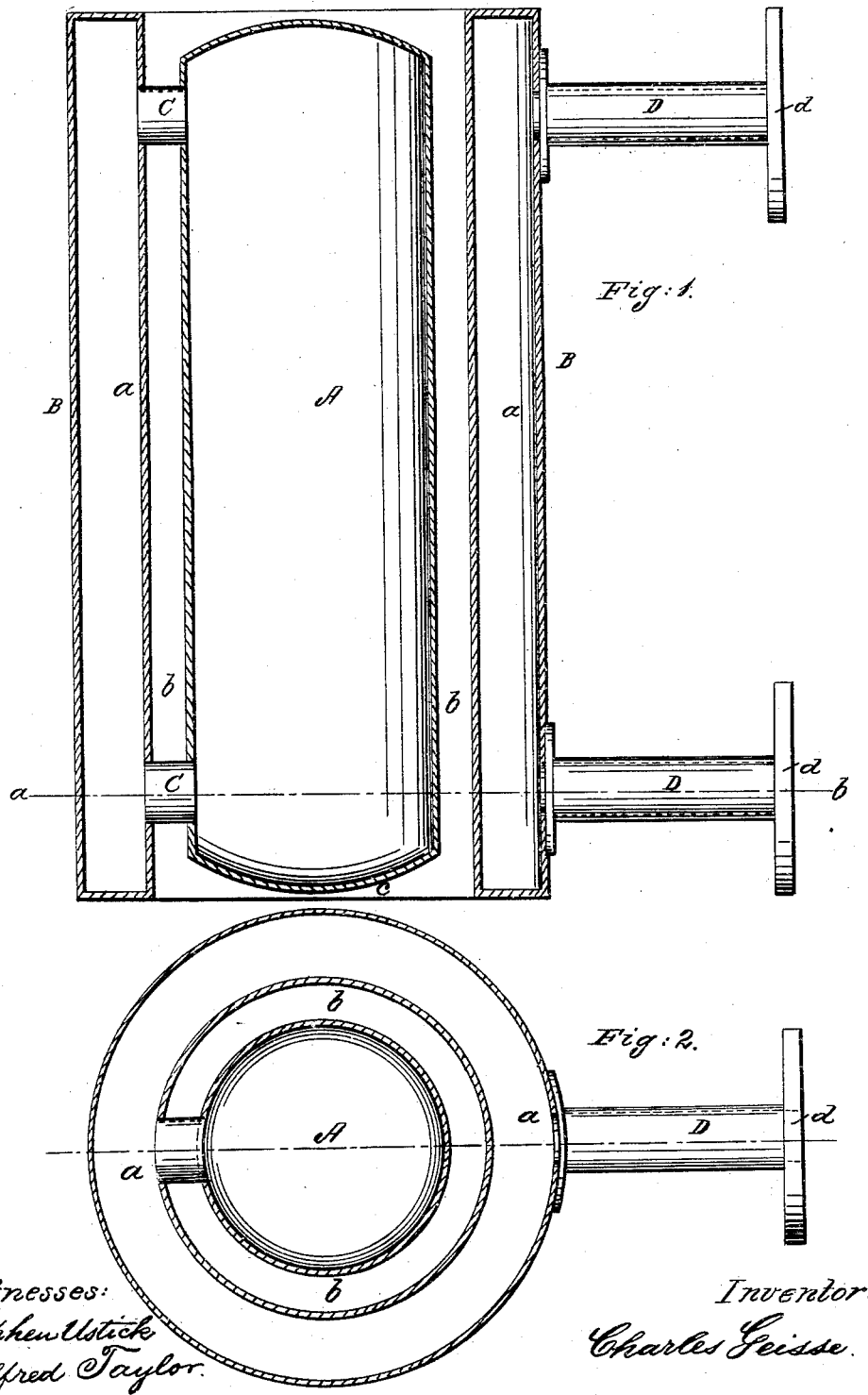

UNITED STATES PATENT OFFICE.

CHARLES GEISSE, OF TAYCHEEDAH, WISCONSIN.

BOILER FOR GAS-HEATERS.

Specification forming part of Letters Patent No. 58,807, dated October 16, 1866.

*To all whom it may concern:*

Be it known that I, CHARLES GEISSE, of Taycheedah, in the county of Fond du Lac and State of Wisconsin, have invented a new and Improved Gas and Vapor-Fluid Heater; and I do hereby declare that the following is a full, clear, and exact description of the construction and operation of the same, reference being had to the annexed drawings, making a part of this specification, in which—

Figure 1 is a vertical section of the apparatus. Fig. 2 is a cross-section at the red line $a\ b$ of Fig. 1.

Like letters in both figures represent the same parts.

The nature of my invention consists in heating water, fluids, semi-fluids, or other substances in wooden, stone, or other vessels, to which the direct action of fire cannot be safely applied, by the combustion of oil, coal-oil, and other inflammable fluids, gases, or vapors acting directly upon a heater located a safe distance from the said vessel or vessels, but communicating therewith by means of pipes or other passages, by means of which a communication is kept up between the interior of said heater and the vessel or vessels containing the water or fluid to be heated, in such a manner that a portion thereof shall at all times be contained in the heater, in consequence of the flowing and reflowing of the fluid between the said vessel and the heater.

To enable others skilled in the art to which my improvement appertains to make and use my invention, I will proceed to describe its construction and operation.

I construct a heater in a cylindrical coil or other suitable form, and by means of one or more pipes form a communication between its interior and the interior of the vessel or vessels containing the fluid to be heated, and arrange beneath such heater any known apparatus for the combustion of oil, inflammable gas, fluid, or vapor.

I have represented in the drawings a cylindrical central heater, A, in a vertical position, beneath which any such heat-generating apparatus is to be placed. This cylinder is surrounded by a double-cylinder heater, B, connected at each end, so as to form an annular space, $a$, to contain some portion of the fluid to be heated.

The inner diameter of the said heater B is larger than the outer diameter of the heater A, so as to form a space, $b$, for the passage of the heat from the heat-generating apparatus in its upward movement, the heat first striking the curved end $c$ of the heater, and thence, in its upward course, heating the exterior surface of the same and the interior periphery of the heater B, by which means the fluid contained in both cylinders is heated, and the heat thence imparted to the vessel or vessels containing the water or fluid to be heated, there being an open communication between the said vessel or vessels, the cylinder B, and the heater A, effected as follows:

The heater A is connected with the heater B by means of the short pipes C C, and the said cylinder is connected with the receiving-vessel by means of pipes D D, which have flanges $d\ d$, that are confined to the said vessel or vessels by means of screws, bolts, or otherwise. In consequence of these connections there is established a continuous current between the said vessel and the heater of the liquid to be heated.

Having thus fully described my invention, what I claim therein as new, and desire to secure by Letters Patent, is—

The combination of the heaters A B, arranged and operating in relation to each other and to the vessel or vessels containing the fluid or other matter to be heated, and to any known appliance for the combustion of oil, coal-oil, or other inflammable fluid, gas, or vapor, substantially upon the principle and in the manner hereinbefore set forth.

In testimony that the above is my invention I have hereunto set my hand and affixed my seal this 1st day of July, 1865.

CHARLES GEISSE. [L. S.]

Witnesses:
STEPHEN USTICK,
JOHN WHITE.